United States Patent [19]

Chiba et al.

[11] Patent Number: 4,969,772
[45] Date of Patent: Nov. 13, 1990

[54] ROAD SURFACE HEATING APPARATUS FOR REPRODUCING THE DETERIORATED ROAD SURFACE

[75] Inventors: Tatsuhiko Chiba, Kawaguchi; Akira Obuchi, Kawasaki, both of Japan

[73] Assignee: Taisei Road Construction Co., Ltd., Tokyo, Japan

[21] Appl. No.: 390,995

[22] Filed: Aug. 9, 1989

[30] Foreign Application Priority Data

Apr. 17, 1989 [JP] Japan ................... 1-44832[U]

[51] Int. Cl.$^5$ .............................................. E01C 19/00
[52] U.S. Cl. ............................................ 404/77; 55/97
[58] Field of Search ............... 404/77, 79, 95; 55/97; 422/900

[56] References Cited

U.S. PATENT DOCUMENTS

| 3,885,929 | 5/1975 | Lyon et al. | 55/94 X |
| 4,226,552 | 10/1980 | Moench | 404/77 X |
| 4,283,223 | 8/1981 | Billard | 55/97 X |
| 4,419,108 | 12/1983 | Frost et al. | 55/97 |
| 4,448,757 | 5/1984 | Barnwell et al. | 55/97 X |
| 4,662,899 | 5/1987 | Tandon | 55/97 X |
| 4,809,391 | 3/1989 | Soldatovic | 55/97 X |

Primary Examiner—William P. Neuder
Attorney, Agent, or Firm—Cushman, Darby and Cushman

[57] ABSTRACT

A road surface heating apparatus for repairing a deteriorated asphalt paved road includes an air shut out device with skirt members surrounding the heating panel so as to prevent air from entering into the heating apparatus, thereby restraining smoke generation. The generated smoke is filtered and purified by an after-burner and a catalyst burner and then exhausted, thus air pollution problems at the work site are solved.

4 Claims, 4 Drawing Sheets

ROAD SURFACE HEATING APPARATUS FOR REPRODUCING THE DETERIORATED ROAD SURFACE

BACKGROUND OF THE INVENTION

1. Field of the Invention

The present invention relates to an apparatus for heating the road surface to reproduce the deteriorated surface of the asphalt paved road.

2. Description of the Prior Art

The conventional method of reproducing the deteriorated surface of the asphalt paved road by applying heat to the road surface, then scarifying the surface, adding some reproductive additives and new asphalt composite thereinto and finally finishing by rolling is highly valued because the method can save materials and time resulting in lower cost.

Referring to FIG. 7, the conventional method of reproducing the deteriorated asphalt paved road surface will be explained hereinafter. Road surface heating vehicles $A_1$ $A_2$ are provided with heating panels 1, 2, 3 which are adapted to heat the deteriorated surface of the asphalt paved road. Following after the vehicles $A_1$ $A_2$, a road surface repoducer G equipped with a scarifier B, a screw spreader C, a screed D and a hopper F proceeds. The scarifier B scarifies the heated surface and scatters some additives and new composite paving materials, the screw spreader C stirs the mixture, and finally a screed D completes surfacing. Following after the road surface reproducer G, a roller vehicle E proceeds, thus the reproducing of the deteriorated asphalt road surface is completed.

As shown in FIG. 7, the road surface reproducer G provides the scarifier B, the screw spreader C, the screed D and the hopper F which carries the new composite paving materials, so the road surface reproducer is also sometimes called a "reformer". In some cases, the reformer carries a mixing apparatus.

PROBLEMS TO BE SOLVED

The above-mentioned prior art has the following problems. During the heating process with the surface heating vehicles $A_1$ $A_2$, air flows from the periphery of the panel heater into the heating area, and causes the asphalt to burn resulting in generation of so called "blue-smoke". This smoke makes the working area badly air-polluted, so that the operators of the road surface heating vehicles or the workers who engage in road reproduction suffer from a such hazardous environment. Additionally, drivers who pass through such a working area are suffer from low visibility due to the smoke, and residents who live near such a working area are also suffered from the air pollution. Although the conventional method has some advantages from the view point of saving paving material and time, the smoke generation is regarded as a weak point encountered in the conventional method. In addition, the generation of smoke accelerates the deterioration of the asphalt pavement.

One object of the present invention is to propose an apparatus for road surface heating which eliminates the aforementioned disadvantages of the conventional method and which purifies the smoke even if it is generated.

SUMMARY OF THE INVENTION

To attain the above mentioned object, an air tightening device is provided along the periphery of the panel heater and a smoke stack with an air filtering device therein is detachably installed at the upper side of the heating panel. The air filter is made of glass fibers with fine meshes. In some cases, a catalytic burning apparatus with an after-burner is used in lieu of the glass fiber filter. The filtered smoke is exhausted into the air.

Since air flow into the heating panel is prevented by the air tightening device, if the depth for reproducing is very small, for instance, two centi-meters, the surface temperature of the road will be raised but burning of the asphalt is prevented since no air flows in, thus the smoke generation at the road surface is restrained. Where the depth for reproducing is five centi-meters, the heating panel has to move slowly, accordingly the air tightening device above can not prevent smoke generation. In such a case, the generated smoke is introduced into the smoke stack, wherein catalytic burning occurs with the installed after-burner therein so that the smoke may be purified and exhausted to the atmosphere. Hazardous particles contained in the smoke like carbonaceous gas or sulfurous gas are purified by the catalytic burning apparatus.

The heating apparatus according to the present invention restrains smoke generation although the surface of the asphalt paved road is raised higher than the normal case. Additionally even if smoke is generated, it is filtered, purified and exhausted to the atmosphere. Because of such advantages, the spacing between the surface heating vehicles and the surface reproducing vehicle can be widened, and such wider spacing enables the effective scarifying work since enough timing for transmitting heat to the desired depth can be provided, thus the scarifying work down to the desired depth can be performed effectively.

DESCRIPTION OF THE PREFERRED EMBODIMENTS

Figure 1:
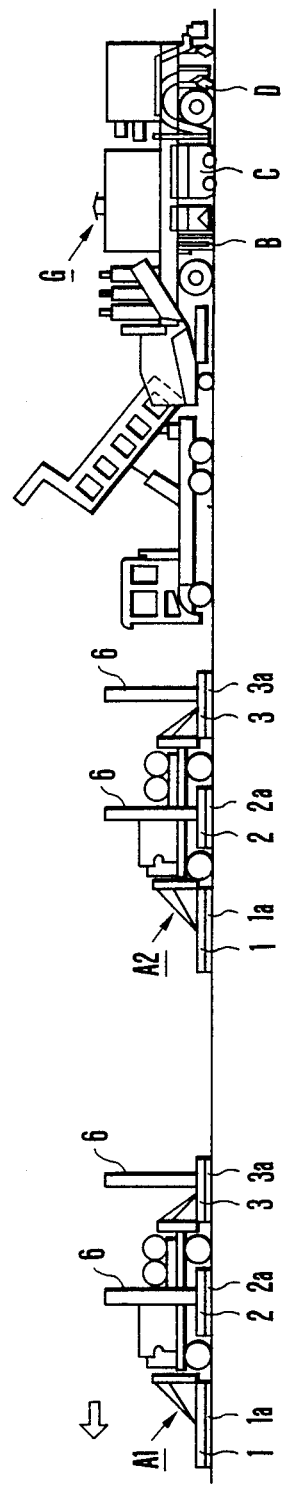
FIG. 1 is an explanatory drawing for a method of reproducing the deteriorated asphalt paved road surface with a road surface heating apparatus according to the present invention.

Referring to the accompanying drawings, one preferred embodiment of the present invention will be explained hereinafter. Referring to FIG. 1, a first heating panel 1, a second heating panel 2, and a third heating panel 3 provide air tightening devices 1a, 2a, 3a, respectively. The second heating panel 2 and the third heating panel 3 of the first and the second road surface heating vehicles A$_1$, A$_2$ provide smoke stacks 6, 6 respectively.

Figure 2:
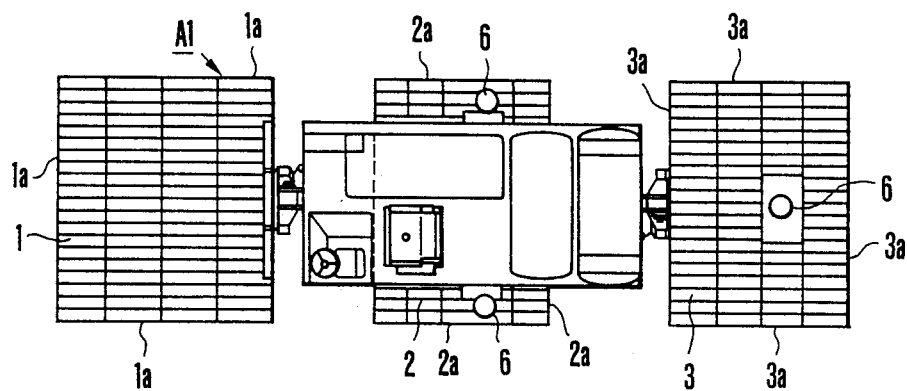
FIG. 2 is a plan view of a road surface heating vehicle shown in FIG. 1.
Figure 3:
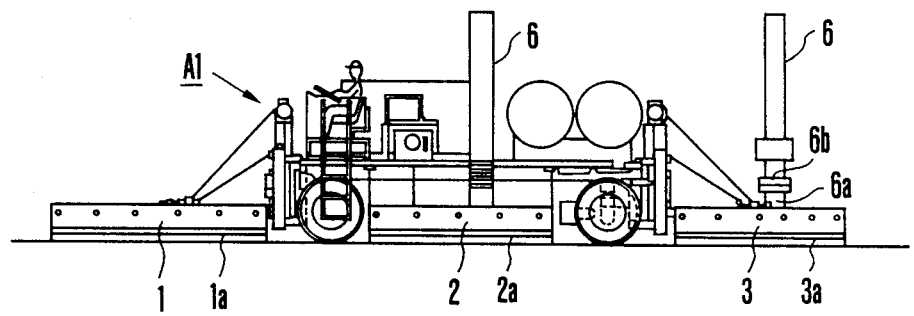
FIG. 3 is a side view of a road surface heating vehicle shown in FIG. 2.
Figure 5:
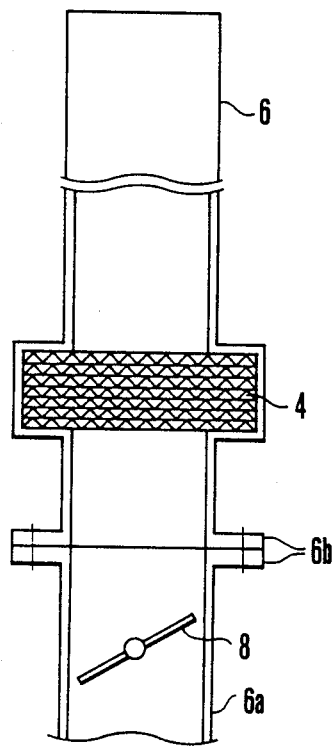
FIG. 5 is a sectional view drawing of a smoke staok according to the present invention.
Figure 6:
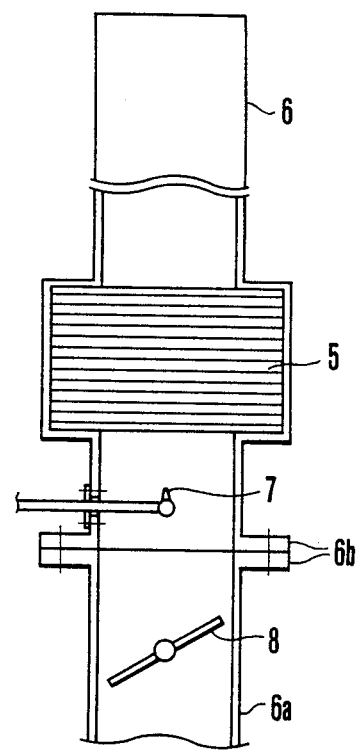
FIG. 6 is a sectional view drawing of a smoke stack with a catalytic burning apparatus according to the present invention.
Figure 7:
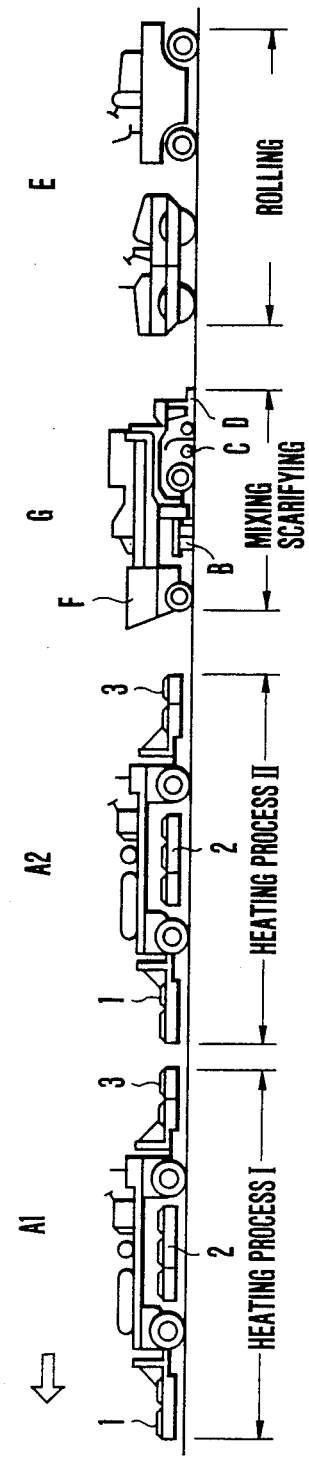
FIG. 7 is an explanatory drawing for a method of reproducing the deteriorated surface of the asphalt paved road according to the prior art.

The details of these smoke stacks are shown in FIG. 5 and FIG. 6. A detailed plan view of the road surface heating vehicles A$_1$, A$_2$ is shown in FIG. 2. Numeral 6 denotes a smoke stack installed at the upper side of the heating panels 2, 3. A detailed side view of the road surface heating vehicles A$_1$ A$_2$ is shown in FIG. 3. The smoke stacks 6, 6 are detachably installed by flange connections 6a, 6b.

Referring to FIG. 5 and FIG. 6, details of the smoke stack will be explained. Numeral 4 denotes a filter which eliminates dusts and mists contained in the smoke and is made from thermally resistive textile fibres. Numeral 5 denotes a catalytic burning apparatus and provides an after-burner 7 at the inlet side of the catalytic burning apparatus 5. Since hazardous particles contained in the smoke are carboneous and sulferic substances, a platinous catalyst formed in molecular or in honeycomb shape is used. For instance, alumina or cordierite plated with a thin platinum layer is used, and a plurality of such layers formed in the honeycomb are laminated and laid up in the smoke stack 6 as shown in FIG. 6. Numeral 8 denotes a damper which controls the volume of smoke coming in.

As other embodiments of the present invention, a combination of the filter section and the catalytic burning apparatus or installing a blower in the smoke stack are possible.

Figure 4:
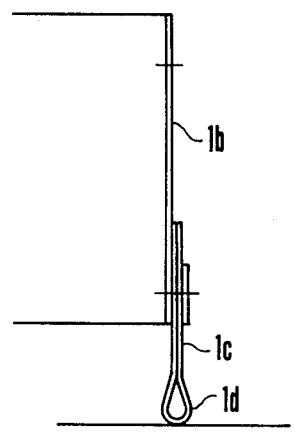
FIG. 4 is a detailed drawing of an air tightening device according to the present invention.

Referring to FIG. 4 how to shut out the air flow will be explained. A heat resistive and flexible skirt member 1c is folded at its end so that its end 1d may touch with the road surface, and this skirt member 1c is fixed to an outer frame 1b of the heating panel. The heating panel comprises an infrared radiation panel which is effective to transfer heat to the inner side of the asphalt paved road. The skirt member 1c is provided at each side of the heating panel so as to shut out the air flow. Although the air flow into the heating panel is prevented, there are provided small air entering gaps between each skirt so that the minimum amount of air required for fuel gas combustion may leak in.

As aforementioned, since the skirt member 1c shuts out the air flowing into the heating area, asphalt burning of is prevented although the asphalt surface is heated to a high temperature, thus the smoke generation is restrained.

TABLE 1
ROAD TEMP.-SMOKE CONCENTRATION

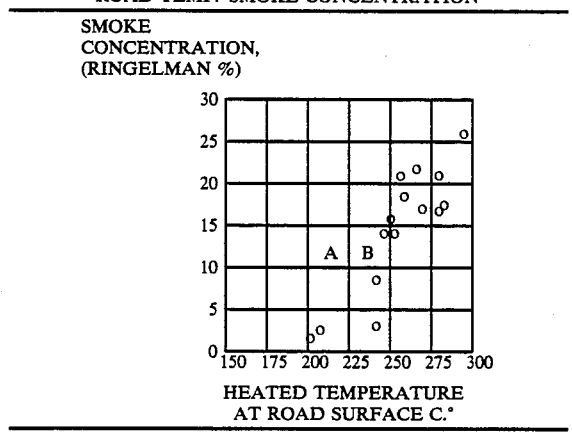

HEATED TEMPERATURE AT ROAD SURFACE C.°

Referring to Table 1, how effectively the air tightening device, according to the present invention, works will be explained. These data were derived after a field test. X-abscissa shows the temperature at the asphalt paved road surface, and the Y-ordinate shows the smoke concentration expressed in % of Ringelmann chart. Line A shows the smoke concentration where no skirt members are provided and line B shows the smoke concentration where the skirt members are provided according to the present invention.

As the table shows, where the skirt members are provided, the smoke concentration is lowered comparing with the case of no skirt members. Thus, the smoke generation was restrained although the road surface was heated to the higher temperature. The generated smoke was purified by the filter or the catalytic burning apparatus which includes the after-burner, and then was exhausted to the atmosphere, so the problems of air pollution and occupational hazards were solved. When the after-burner was placed at the inlet side of the catalytic burning apparatus, the deactivation of the catalyst caused by the carbon particles adhered thereto was restrained, and the life of catalyst was extended.

Table 2 explains how effectively the smoke was purified when the catalyst burning apparatus with the after-burner was installed in the smoke stack.

TABLE 2

| SUMMARY OF SMOKE TEST BEFORE AND AFTER CATALYSIS | | |
|---|---|---|
| CATALYSIS TEMPERATURE | BEFORE CATALYSIS | AFTER CATALYSIS |
| 300° C.~400° C. | SMOKE ASPHALT SMELT | SMOKE NO ASPHALT SMELL |

The catalyst used in this test is a cordierite plated with platinum and is shaped in honeycomb and its dimension is 15×15×5 centi-meters, and the temperature in catalyst was maintained from 300° C. to 400° C. As the table 2 shows, although the smoke and the asphalt smell were detected at the inlet side of the catalyst, after passing through the catalytic burning apparatus with the after-burner therein, both smoke and smell were almost diminished. The smoke velocity passing through the catytic. burning apparatus was approximately 30 centimeters per second.

As aforementioned, according to the present invention, since the air flow into the heating panel is shut out, burning of asphalt and the smoke generation are restrained although the surface of the asphalt is heated up high enough to reproduce the deteriorated asphalt road. Furthermore, even if the smoke is generated, the smoke is purified by the catalytic burning appraratus with the after-burner, and thus the problems of air pollution and occupational hazards are solved. In addition, the smoke stack is easily removed during transportation since it is flange connected, so this is one of the advantages of the present invention.

As many apparently widely different embodiments of this invention may be made without departing from the spirit and scope thereof, it is to be understood that the invention is not limited to the specific embodiments thereof except as defined in the appended claims.

What is claimed is

1. A road surface heating apparatus which is movable on an asphalt paved road surface from one place to another in order to continuously repair deteriorated portions of the asphalt paved road surface, comprising:

a heating panel, skirt means attached to the periphery of said heating panel and adapted to shut air flow thereto by abutting against the asphalt paved road surface during movement thereover, a smoke stack detachably attached to the upper side of said heating panel, and, a filtering device installed in said smoke stack to eliminate dusts.

2. A road surface heating apparatus as claimed in claim 1, wherein said filtering device comprises an after-burner and a catalytic burning apparatus.

3. A road surface heating apparatus as claimed in claim 1, said skirt means comprising at least one flexible skirt member fixed to an outer frame portion of said heating panel and being folded over at one end, so that the folded over end abuts against the asphalt paved road surface.

4. A road surface heating apparatus as claimed in claim 3, said at least one flexible skirt member being provided at each side of said heating panel.

* * * * *